No. 625,657. Patented May 23, 1899.
S. ELLIOTT.
BICYCLE HOLDER.
(Application filed May 7, 1897.)
(No Model.) 2 Sheets—Sheet 2.
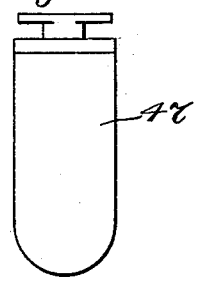
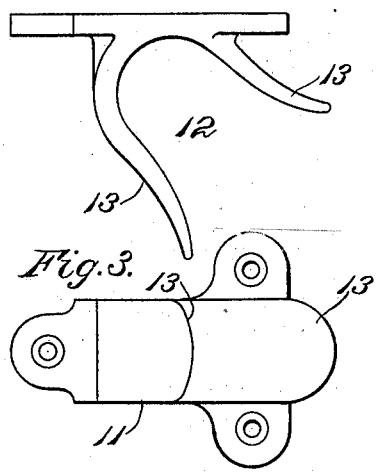
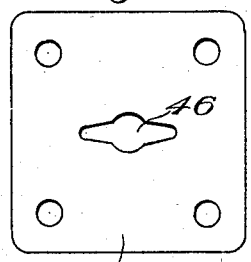
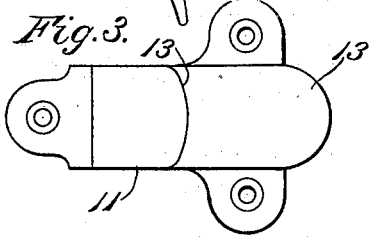
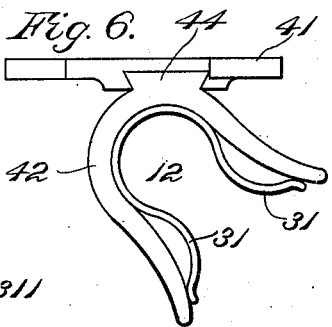
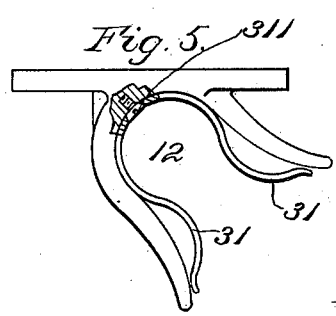
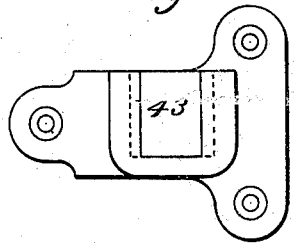
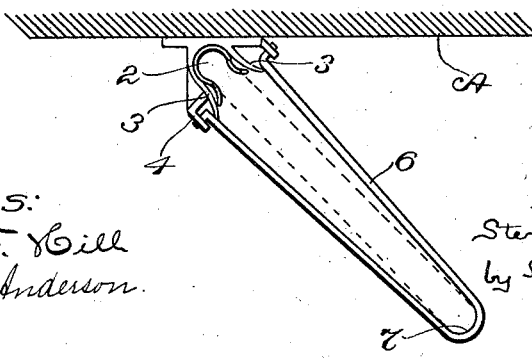
Witnesses:
Oscar F. Hill
Edith J. Anderson.
Inventor:
Sterling Elliott
by Macleod Calver
& Randall
Attorneys.

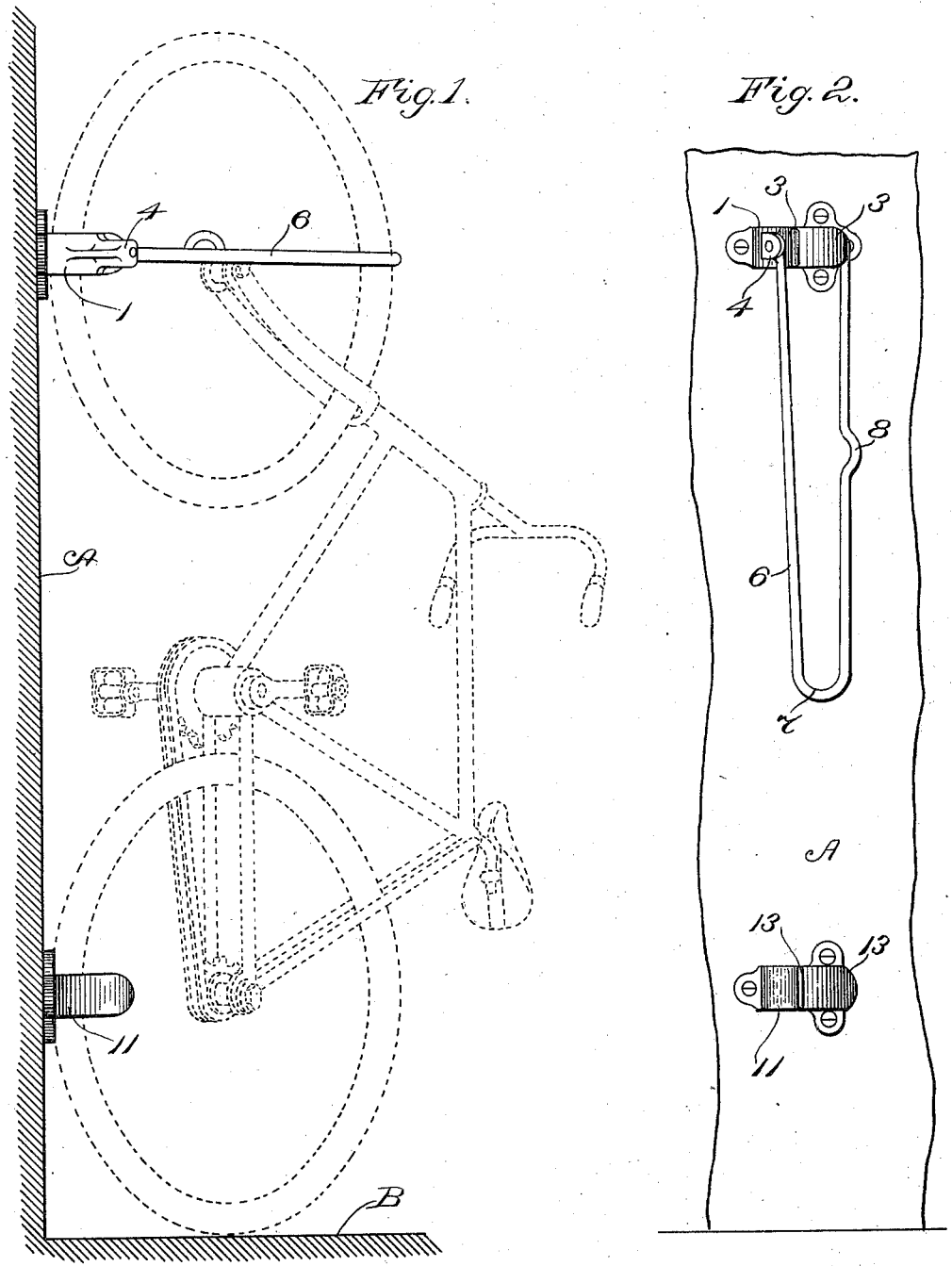

UNITED STATES PATENT OFFICE.

STERLING ELLIOTT, OF NEWTON, MASSACHUSETTS, ASSIGNOR, BY DIRECT AND MESNE ASSIGNMENTS, TO GEORGE H. WILLIAMS, OF SAME PLACE, FRANK W. WHITCHER, OF BOSTON, MASSACHUSETTS, AND HOWARD C. NOBLE, OF NEW BRITAIN, CONNECTICUT.

BICYCLE-HOLDER.

SPECIFICATION forming part of Letters Patent No. 625,657, dated May 23, 1899.

Original application filed November 20, 1896, Serial No. 612,797. Divided and this application filed May 7, 1897. Serial No. 635,500. (No model.)

*To all whom it may concern:*

Be it known that I, STERLING ELLIOTT, a citizen of the United States, residing at Newton, in the county of Middlesex and State of Massachusetts, have invented certain new and useful Improvements in Bicycle Holders or Supports, of which the following is a specification, reference being had therein to the accompanying drawings.

The invention which is claimed herein is a division of that which is presented in my prior application, filed November 20, 1896, Serial No. 612,797, on which United States Letters Patent were granted to me August 10, 1897, No. 587,945. The said Letters Patent relate to and cover more especially the combination and arrangement of a plurality of bicycle holders or supports in a certain system or series providing for the support of a series of bicycles. The division of the invention which is covered by such Letters Patent provides for storing such a series of bicycles to the best advantage within a store-room, car, or the like.

The present division of my invention has reference more particularly to the character and construction of the bicycle holders or supports themselves, which fit them for use in general.

The question of supporting or storing bicycles—as, for example, during the intervals when they are not in use—is at the present time one of very great importance, in consequence of the immense number of bicycles which are in use. So also is the question of storing or supporting bicycles during transportation by railway-cars and the like. Bicycles are awkward and inconvenient things to support or store, and their size, shape, and proportions are such that when stored or supported according to the methods which have been in vogue heretofore and by means of the forms and arrangements of holding and supporting devices which have been known heretofore they obstruct or occupy a disproportionate amount of floor-space. Inconvenience and difficulty are experienced even when it is required to store a single bicycle, or, say, two, in a dwelling. The difficulties and inconvenience are increased in connection with the storing of a number of bicycles in a salesroom or the store-room of a club. The problem becomes a very serious one in connection with the storing and support of bicycles during their transportation. In a railway-car bicycles not only obstruct very seriously the necessarily-limited interior space thereof, but they encroach upon the space which should be occupied by ordinary baggage or for other purposes. As usually stored in a railway-car, also, most of the bicycles in the latter are inaccessible until others in front of the same or on top of them have been shifted out of the way. Great care must be exercised in order to avoid injury to bicycles while they are in the car; but notwithstanding the care that is exercised it happens frequently that parts become broken and the enameled or other finished surfaces become scratched or otherwise marred.

Many devices have been provided heretofore for the purpose of holding or supporting bicycles when the latter are not in use, without giving satisfaction, however. The lack of success in this direction has been due largely, in my opinion, to failure to conform to the practical requirements which are incident to the conditions and place of use. The prior devices have not possessed the requisite convenience and have not responded to the said requirements.

The general aim of the present invention is to provide bicycle-supporting devices which shall conform properly to the said practical requirements and shall receive bicycles and support or hold them in a practical and satisfactory manner while being either stored or transported and which shall be capable of being employed in dwellings, offices, salesrooms, store-rooms, railway-cars, and elsewhere where it is desired to make provision for receiving and upholding bicycles that are not actually in use.

More particularly, one object of the invention is to provide holders or supports contrived and arranged to receive the bicycles and keep them very completely out of the way and so as to leave as much valuable space as possible available for other purposes.

Another object of the invention is to provide holders or supports of improved character and construction to which the bicycles may be applied quickly and conveniently and by means of which the bicycles may securely be held while applied thereto.

The invention consists in holders or supports which are designed to be combined with or applied to the interior wall of a room or car or equivalent upright support and hold a bicycle in a vertically-extended position adjacent to said wall—that is to say, with one wheel thereof upraised above the other wheel—the bicycle occupying a position standing at an angle to the wall, whereby it is caused to occupy or obstruct a minimum amount of floor-space, leaving the interior of a room or car with a much larger unencumbered and available amount of space than heretofore.

The invention consists, also, in various features of construction and novel combinations of parts, all of which are fully described hereinafter, and afterward particularly pointed out in the claims at the close of this specification.

Reference will now be had to the accompanying drawings, in which the best embodiments of my invention which I have yet contrived are illustrated.

Figure 1 of the said drawings shows in side elevation supports embodying my invention, the said supports being represented as applied to a vertical wall, the latter and a portion of floor adjacent the same being indicated in section and a bicycle being represented in dotted lines as applied to the said supports. Fig. 2 is a view in elevation looking from the right in Fig. 1, with the bicycle removed and with the retainer or bail, to which reference is made hereinafter, swung into its depressed position. Fig. 3 is a view, in front elevation and on an enlarged scale, of a simple form of the lower holder of Figs. 1 and 2. Fig. 4 is a view in plan of the holder shown in Fig. 3. Fig. 5 is a view in plan, with a small part broken away, of a form of the said lower holder in which compressible or yielding face-pieces are employed. Fig. 6 is a view in plan showing a form of the lower holder which, like that form shown in Fig. 5, has compressible or yielding face-pieces applied thereto and which also is made in separable portions, as is explained hereinafter. Fig. 7 is a view in front elevation of the base-plate of Fig. 6. Figs. 8 and 9 show a modified form of separable construction. Fig. 10 is a view in plan of the upper holder and its retainer.

A, Figs. 1 and 2, designates an upright support, which may be, for instance, the interior vertical wall of a room or of a car, and B, Fig. 1, the ground or floor. On the said support or wall A, I secure firmly, by means of screws or other suitable securing means, a block or holding device 1. This is provided with the U-shaped recess 2, into which the tire and rim of a bicycle-wheel will fit. Preferably the width of the recess is such that the tire will be compressed somewhat laterally as it is forced into place. The projections 3 3, which form the walls or jaws of the recess or opening 2, flare or diverge slightly at their outer ends, as shown, to facilitate the operation of introducing the tire of a bicycle-wheel into the said recess. At the outside of each of the said projections 3 is a lip 4, which is formed with a hole to receive the bent end of the U-shaped wire bail or retainer 6, each end of which is bent substantially at right angles to form pivots which engage the said holes in the projections 4, as shown clearly in Figs. 1, 2, and 10. The said U-shaped bail or retainer is made of a length sufficient to enable it, when the front wheel of the bicycle has been upraised and the bicycle has been given the position indicated in dotted lines in Fig. 1 and the tire of the elevated wheel is placed in the U-shaped recess 2, to drop over the said wheel, the bight 7, Fig. 2, of the said bail or retainer 6 engaging the periphery of the wheel opposite the holder 1, as shown in Fig. 1. As will be clear, the said U-shaped bail or retainer 6 is not greater in length than the diameter of the wheel. One side or portion of the same may be provided at the proper place with a lateral U-shaped bent or offset portion 8, Fig. 2, when desired, in order to accommodate a cyclometer, when one is present, in the usual position in which cyclometers are placed.

The bicycle-supporting device which has just been described is characterized by the fact that it is constructed and arranged to engage an abnormally-elevated portion of a vertically-extended or upended bicycle and sustain the bicycle with one wheel thereof upraised above the other against both outward and endwise movement, the portions thereof which engage with the bicycle extending or standing at an angle with relation to the wall or support, and thereby operating to maintain the bicycle in a plane also at an angle to the latter. Usually in practice this angle is one of forty-five degrees. The latter position lessens the extent to which the bicycle projects from the wall or other support, and at the same time it enables the bicycles to be placed most closely together without contact or engagement of the projecting parts of adjoining bicycles. As will be perceived, the block or holder 1 constitutes a mounting to which the bail or retainer 6 is movably hung.

When a wheel is not in the holder, the bail or retainer 6 will drop down against the wall or other support to which the holder is secured and will be out of the way, or, if desired, the said bail or retainer 6 may be disengaged easily from the block after having dropped down into a vertical position by simply compressing the sides together, so as to withdraw its bent ends out of the holes in the lips 4, and then may be removed. As the outer ends of the jaws 3 diverge slightly, (see Fig. 10,) it follows that when the bail or retainer 6 is swung up into a substantially horizontal position its inner ends are spread apart by the said ends of the jaws 3 and cannot then be withdrawn from the holes in the lips 4.

At a proper distance below the holder 1 and at a sufficient distance above the ground or floor of the room or car to permit the lower or rear wheel of the bicycle to rest on the latter when the bicycle is in the position shown in Fig. 1 I secure by screws or other securing means a second holder 11, which is somewhat similar in shape to the block 1. The said block 11 is provided with jaws 13, which extend outwardly, leaving a U-shaped recess or opening 12 between said jaws, said opening or recess having, like the recess of holder 1, a lateral obliquity, it lying in the present embodiment of the invention at an angle of forty-five degrees to the plane of the wall. The jaws 13 diverge at their outer ends to facilitate the operation of introducing the tire of a bicycle-wheel between the same, and the recess or opening 12 is of proper size to fit the bicycle-tire.

When it is desired to support a bicycle, it is raised into a vertically-extended or upended position—that is to say, with one wheel thereof upraised above the other. The tire of the upper or front wheel is placed in the opening 2 of the holder 1, and the bail or retainer 6 is allowed to fall over the said wheel, the bight 7 of the said bail or retainer engaging the diametrically opposite portion of the periphery of the said tire. The tire of the lower or rear wheel is placed in the recess or opening 12 of the holder 11. The bicycle thus is secured firmly in its vertically-extended or upended position against the wall of the room or car or other support. A series of pairs of these upper and lower holding devices are placed side by side on the said wall, preferably about eighteen inches apart, horizontally. When the said devices are arranged to hold the bicycles standing in planes at an angle of forty-five degrees to the plane of the wall, as in the drawings, the said distance apart of eighteen inches is sufficient, inasmuch as the projecting portions of the bicycles in the holders will overlap or pass and not engage or interfere with one another. For this reason the openings or recesses 2 and 12 preferably are formed, as above described, with lateral obliquity—that is to say, at an angle to the plane of the wall rather than at right angles thereto. A large number of bicycles may in this way be stored and securely held on the wall of a room or the side of a car.

At Figs. 5, 6, and 9 I have shown the lower holder 11 as having the jaws of the said block provided with compressible or yielding faces 31 31. These faces are secured to the said jaws in any suitable manner and are formed, preferably, of spring metal and so shaped as to partially close the mouth or opening 12 between the said jaws 13.

Fig. 5 shows the two yielding or compressible faces 31 31 as formed by the end portions of a strip of spring material which is secured to the holder by a screw 311. When such a modified holder is employed, the lower or rear wheel of the bicycle is pushed between the spring-faces 31 31, said faces yielding while the rim of the wheel passes between them and then assuming again their normal position when the said tire and rim have passed fully into the recess 12. In this way the lower or rear wheel of the bicycle is more firmly secured in place, as may sometimes be necessary in cars on account of the jar and movement of the cars.

At Fig. 6 I have shown a modification of the lower holder 11 which consists in forming the same in two parts—namely, a base part 41 and a forked part 42, provided with the U-shaped recess or opening. The base part 41 preferably is provided with a dovetailed recess, as indicated at 43, Fig. 7, into which a corresponding dovetail 44 on the part 42 fits. Instead, however, of this dovetail securing device any well-known or equivalent form of detachable securing device may be employed. By this means the projecting part of the holder—that is, the part which embodies the jaw and U-shaped recess or opening—may be removed when the device is not in use. This is desirable, more especially in cars, since the projecting portion would be in the way of trunks or similar baggage which it may be desirable to place close to the side of the car and which otherwise would be scratched or marred by coming in contact with the said projecting portion of the lower holding device.

Figs. 8 and 9 illustrate a separable construction of holder in which the base 45 has an elongated hole 46 centrally thereof, the said hole having an enlargement at mid-length thereof. The forked portion 47 has a T-shaped shank, the head of which extends crosswise of the said portion and which is introduced by first turning the length of said head into position to correspond with that of the slot 46. After inserting the said shank into the said slot, so as to carry the head of the shank behind the plate, the said forked portion is turned quarter-way round, which causes the head to cross the slot at right angles and secures the forked portion in place.

What I claim is—

1. A supporting device for a bicycle, comprising a recessed or open holder to receive the rim and tire of a wheel of the bicycle, and a loop hinged to the said holder at the recess therein so as to engage with the periphery of the said wheel at a point which is opposite the said holder, substantially as described.

2. Supporting devices for a bicycle, comprising two recessed or open holders into which, respectively, the wheels of a bicycle are adapted to be received, and a loop hinged to one of the said holders at the recess therein so as to engage with the periphery of one of the said wheels at a point which is opposite the said holder, substantially as described.

3. The combination with a wall or other support, of a bicycle-supporting device constructed and arranged to engage an abnormally-elevated portion of a vertically-extended or upended bicycle and sustain the bicycle with one wheel upraised above the other against outward and sidewise movement, the bicycle-engaging portion of the said device extending at an angle with relation to the wall or support and maintaining the bicycle in a plane also at an angle to the latter, substantially as described.

4. The combination with a wall or other support, of a bicycle-supporting device constructed and arranged to engage with the abnormally-elevated wheel of a vertically-extended or upended bicycle and sustain the bicycle with one wheel upraised above the other against outward and sidewise movement, the said device extending from the said wall or support at an angle thereto and holding the bicycle at an angle to the wall or support, substantially as described.

5. The combination with a wall or other support, a mounting attached to the said wall, and a retainer movably hung to the said mounting, positioned to engage with an abnormally-elevated portion of a vertically-extended or upended bicycle and constructed to hold the bicycle with one wheel upraised above the other and against outward and sidewise movement, the movable connection of the retainer with the said mounting enabling it to be turned out of the way when not in use, substantially as described.

6. The combination with a wall or other support, of the recessed or open holder applied thereto at a height to receive the abnormally-elevated wheel of a bicycle standing in vertically-extended or upended position, and the retainer to keep the said wheel in the said holder, whereby the bicycle is held with one wheel thereof upraised above the other against outward and sidewise movement, substantially as described.

7. Wall supporting devices for a bicycle, comprising two holders, one of which is placed above the other, each holder fitted to receive the tire of a wheel, and a retainer in connection with the upper holder to keep the wheel in the latter, substantially as described.

8. Wall supporting devices for a bicycle, comprising holders having U-shaped recesses to receive the tires of the respective wheels, one of such holders being located above the other, and a retainer to keep the elevated wheel in the holder therefor, the lower holder having in the recess thereof compressible or yielding face-pieces which normally close partially the said recess, whereby when the tire of the lower wheel is pressed into such recess the said face-pieces will yield to permit it to enter and then will close upon it and hold it in place, substantially as described.

9. Wall supporting devices for a bicycle, comprising holders having U-shaped recesses to receive the tires of the respective wheels, one of such holders being located above the other, whereby to maintain one wheel of the bicycle upraised above the other, and a retainer to keep the elevated wheel in the upper holder, the lower holder being formed in separable portions to enable the projecting portion which contains the recesses to be removed when required, substantially as described.

10. The combination with the wall of a car, or the like, of an upper securing device to receive the upraised wheel of a bicycle, a plate secured at a lower point, and a holder constructed to engage the lower wheel of the bicycle at or adjacent to the periphery thereof and hold the wheel in place, said plate and holder having a separable connection by means of a socket upon one thereof and a shank upon the other thereof, the said shank interlocking with the socket when in place therein, substantially as described.

In testimony whereof I affix my signature in presence of two witnesses.

STERLING ELLIOTT.

Witnesses:
FRANK G. PARKER,
FRANK G. HATTIE.

It is hereby certified that in Letters Patent No. 625,657, granted May 23, 1899, upon the application of Sterling Elliott, of Newton, Massachusetts, for an improvement in "Bicycle-Holders," errors appear in the printed specification requiring correction, as follows: On page 4, line 30, after the word "support" the word *of* should be inserted and same page, line 80, the word "recesses" should read *recess;* and that the said Letters Patent should be read with these corrections therein that the same may conform to the record of the case in the Patent Office.

Signed, countersigned, and sealed this 20th day of June, A. D., 1899.

[SEAL.] WEBSTER DAVIS,
*Assistant Secretary of the Interior.*

Countersigned:
    C. H. DUELL,
        *Commissioner of Patents.*